Jan. 18, 1955 P. BOONE 2,699,706
ORNAMENTAL OBJECT HAVING BIREFRINGENT AND POLARIZING LAYER
Filed Nov. 8, 1949

INVENTOR
Philip Boone

United States Patent Office 2,699,706
Patented Jan. 18, 1955

2,699,706

ORNAMENTAL OBJECT HAVING BIREFRINGENT AND POLARIZING LAYERS

Philip Boone, Winchester, Mass.

Application November 8, 1949, Serial No. 126,099

4 Claims. (Cl. 88—65)

This invention relates to light-modifying materials and objects and to constructions relating thereto. More particularly, the invention is concerned with materials and objects for providing interference colors and patterns suitable for use in the decorative or ornamental arts such as for jewelry and other artistic and useful products.

It is well known that a predetermined arrangement of light-polarizing materials and suitable birefringent or optically active materials may be used for producing interference colors. Such a result may, for example, be achieved by a pair of crossed polarizers with a birefringent or optically active material having a predetermined direction of its principal axis or axes positioned therebetween. It is further known that a reflecting means may be employed with a light polarizer and a birefringent or optically active material for production of interference colors. This result may, for example, be obtained by the transmittal of light through the polarizing and birefringent (or optically active) materials to a reflecting surface and thence, reversely through the birefringent (or optically active) and polarizing materials, the birefringent material, for example, altering the direction of and providing a predetermined retardation between vibration components and the polarizing material serving both as a polarizer and an analyzer. Polarizers of the type contemplated herein are of a film-like or layer-like form. It is also known that various coatings may be applied to surfaces for reducing and increasing reflection therefrom and for providing interference colors.

It is believed that no significant commercial application of combinations of polarizing and birefringent or optically active materials for ornamental and useful purposes of the type contemplated herein has occurred, nor any combination therewith of reflecting surfaces and reflection-modifying coatings for similar objectives. This is apparently due to the different objectives underlying the optical methods and constructions heretofore contemplated. For example, a suggested method for producing interference colors for an unrelated purpose involves a flat arrangement of polarizing and birefringent sheets or strips with a reflecting surface. Such an arrangement necessarily presents a "flat" metallic appearance rather than the crystal-like or limpid quality which is present in examples of the present invention wherein a "depth" and interplay of colors is achieved. This crystal-like quality may, in general, be said to be largely attributable to the gradually varying retardation and polarization of components of light in passing through gradually varying thicknesses of the materials employed. Said gradually varying thicknesses are provided by the curved constructions of the invention and the desirable effects are furthered by the converging or positive lens-like forms employed. Thus, a third-dimensional property and interplay of interference colors are provided which markedly differ from the effects obtained by a plane parallel relation of components. In said suggested flat assembly, the characteristics thereof also necessarily result in a complete change of color when the assembly is observed from different positions and the color substantially disappears when it is viewed from an acute angle because of the reflectivity of the surface material and incidence of the light rays at the critical angle. Various other characteristics and limitations of an optical and constructional nature unsuited to products of the invention have heretofore existed and, accordingly, it is an object of the present invention to provide composite materials and products of useful and decorative form wherein interference colors and arrangements thereof of improved beauty and visibility are obtained.

Another object of the invention is to provide materials and objects of the character described which produce a characteristic or predominant interference color or colors, irrespective of the position from which they are viewed.

A further object of the invention is to provide such materials and objects wherein interference colors are visible from any viewing position.

Still another object of the invention is to provide a more extensive range and exact control of the interference colors produced.

A still further object of the invention is to provide products of the character described which involve both reflection of light therefrom and transmittal of light therethrough.

Another object of the invention is to provide supplementary means for modifying the vibration components produced by polarizing and birefringent or optically active materials to obtain a modification of the interference colors and other effects.

A further object of the invention is to improve the quality and intensity of interference colors through employment of components for facilitating the transmission and reflection of light.

Still another object of the invention is to provide components and products of a curved or lens-like form for producing interference colors so that the products exhibit a crystal-like or jewel-like quality.

A still further object of the invention is to provide an object of the character described wherein a controlled changeability of the interference colors and a variable illumination of portions of the object is rendered possible.

Other objects of the invention are to provide products of the character described which may readily be manufactured, which possess characteristics of durability as well as of brilliance and beauty, which may be produced in a wide variety of sizes and forms contributing to their extensive usage, and to provide practicable methods for their manufacture.

These and other objects of the invention will be apparent from the following description taken in connection with the accompanying drawings wherein like reference characters refer to like parts throughout the several views of which:

Figure 1:
Figure 1 is a perspective view of various embodiments of the invention illustrating a few of the many possible forms thereof.

The embodiments shown in the drawings may, in general, be considered as considerably enlarged for clarity of illustration.

Referring to Fig. 1, several different representative forms in which objects of the invention may be shaped are illustrated. The forms A, B and C exemplify synthetic jewels, for example, and could be mounted in appropriate settings, i. e. rings, earrings, pendants or the like for ornamental purposes. Forms D and E may be regarded as portions of synthetic jewels or portions of an elongated object such as a bar or cylinder or a flexible strand which could be used in forming a necklace or incorporated in a fabric or the like wherein brilliant interference colors are desired. Arrow 12 indicates a polarizing direction of a light-polarizing component and arrow 14 indicates a principal axis of a birefringent or optically active component as, for example, an optic axis. It will be noted that an angular relationship exists between said direction and axis and it is to be understood that a predetermined angular relation of directions and axes exists between similar components of forms B through E and of other constructions shown in the drawings.

Figure 2:
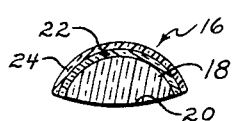
Figs. 2 through 10 are cross-sectional views of various constructions of the invention.

In Fig. 2 an object 16, generally similar to object A of Fig. 1 is shown in cross-section. Object 16 may be considered as a synthetic jewel exhibiting interference color properties. A transparent supporting element 18, formed of glass or of any suitable plastic material such as polystyrene, methyl methacrylate, cellulose acetate, a vinyl resin or the like, or an encased fluid or air space, is provided with a reflecting surface 20. Element 18 may suitably be in the form of a converging lens having convex spherical or aspherical surfaces and may be molded or otherwise shaped to a desired form. The surface of element 18 upon which reflecting surface 20 is formed may, however, be plano or somewhat concave. In the interests of obtaining maximum reflection in a plurality of directions, so that the object will exhibit interference colors when viewed from any position forwardly thereof, said surface is preferably convex or concave (producing respectively, a concave or convex reflecting surface for light passing through the object from the upper surface). In the interests of obtaining both said wide range of reflection and the aforementioned crystal-like quality, surface 20 is preferably convex (producing a concave reflecting surface relative to incident light). Reflecting surface 20 may be formed, for efflample, of aluminum, silver, chromium, magnesium, titanium, vanadium or some other metal. Various methods of forming such reflecting surfaces are well known and the surface may, accordingly, be provided through thermal evaporation in a vacuum, a chemical deposition method, the adhesion of a metallic film, or a spraying or sputtering process.

Further referring to Fig. 2, a birefringent layer 22 is preferably formed upon a convex surface of element 18, namely, that surface opposite the surface upon or adjacent which reflecting surface 20 is formed. Layer 22 may be formed of a substantially clear or slightly diffusing colorless film of a birefringent material such as regenerated cellulose, polyvinyl alcohol, ethyl cellulose, cellulose acetate, a plurality of sections of mica, a crystalline deposition, or of any material having the desired birefringent characteristics. Factors governing a predetermined birefringence of layer 22 are its thickness, micellular, molecular or other structural orientation, and the direction of its optic or crystallographic axes. Assuming, for example, that layer 22 is formed of one of the aforementioned plastic materials, said factors may be controlled by the degree and direction or directions of stretch applied thereto and the direction or directions of orientation which obtain relative to a polarizing component superposed therewith and presently to be described. Through a predetermined control of the above-named factors, any desired order or plurality of orders of interference colors may be obtained. Certain of the films now used for packaging or as protective containers are particularly suitable because of their stretch characteristics and the slight light-diffusing property which they possess. One such film material is "Polythene," manufactured by the E. I. du Pont de Nemours Company. Another is "Koroseal," manufactured by the B. F. Goodrich Company. This type of film also retains a somewhat rubbery elastic property after a desired birefringence has been acquired thereby which renders it susceptible to being formed to a desired shape, such as that of said surface of element 18. A suitable transparent bonding substance is preferably employed between layer 22 and supporting element 18, said substance having a refractive index which preferably approximates the index of one component of the light rays passing through the birefringent material or the index of element 18. Examples of bonding substances which may be employed are a methacrylic resin, polyvinyl butyral, a polymerized polyvinyl acetal resin and glycerol triricinoleate, cellulose nitrate, vinyl acetate, Vinylite XYSG et cetera. If layer 22 is formed over the surface of element 18, rather than preformed, it may be slightly softened with a solvent provided its orientation is not appreciably disturbed or, alternatively, its orientation may be established at the same time it is thus formed on said surface.

Further referring to Fig. 2, a light-polarizing layer 24 is superposed upon layer 22 so that the direction of polarization (polarizing axis) thereof is predeterminedly angularly disposed relative to the optic axis or axes of birefringent layer 22, one preferred arrangement providing an axial relation of 45°. Where crystalline or molecular orientation of a birefringent film or a polarizing film is obtained by a stretching method, it will be understood that the resultant direction of orientation extends in the direction of stretch. Assuming, for example, layer 24 to be a polarizer comprising suitably treated polyvinyl alcohol, it may either be preformed to the desired shape or slightly softened in water and pressed upon layer 22. Alternatively, where the polarizer is formed of polyvinyl alcohol, a polyvinyl alcohol dope may be employed or the polarizer may be treated in an aqueous solution of sodium chloride for somewhat shrinking the same and then restretched over layer 22. If said polarizer is laminated to a birefringent layer of cellulose acetate, for example, the adjacent surface of the cellulose acetate could first be treated with sodium hydroxide and then either water or a polyvinyl alcohol dope employed for effecting the bond. Other methods contemplate the stretching of a substantially unstretched sheet of polyvinyl alcohol over the surface of layer 22 either before or after it has been treated to acquire polarizing properties; the partial shrinking upon said surface of a polarizing film which has previously been stretched to a greater degree than is necessary for polarizing efficiency, and stabilizing treatments such as immersion in a solution of borax and boric acid, subjection to heat et cetera. Various molds, dies and guides as well as controlled heat and pressure and softening agents may also be employed for shaping both the polarizing and birefringent layers.

If other types of polarizers are to be employed, methods of forming the polarizing layer will vary accordingly. Such methods may involve the use of other film-like polarizers than those formed of polyvinyl alcohol such as a film of treated regenerated cellulose, polyvinyl acetal containing oriented molecules of polyvinylene, or polyvinyl orthoborate. Again the method may comprise the flowing or smearing of a colloidal suspension of minute polarizing crystals over layer 22, applications of mechanical stress or other force such as that involved in the rubbing of a slightly softened polarizing layer to predeterminedly orient surface portions thereof, the rubbing of a surface prior to introduction of potentially light-polarizing substances, applications of electric and electromagnetic force et cetera. Any type of polarizer which is adapted to be superposed upon surfaces such as those described herein and to be suitably oriented with respect to a principal axis of a birefringent or optically active layer for producing interference colors is considered to be within the scope of the invention. Accordingly, the polarizer may be of a so-called diffusing type, a partial polarizer, or a polarizer selectively transmitting a given wave length of light. Coaction of the polarizer and birefringent or optically active material may involve plane, elliptical or circular polarization according to the properties of said material and the relation of axes thereof to the polarizing direction of the polarizer. Optically active substances of the type contemplated comprise quartz crystals cut perpendicular to their optic axes, cinnabar, periodite of soda, sodium chlorate, sulphate of strichnine et cetera. A combination of polarizing and birefringent components followed by a quarter wave plate formed, for example, of cellulose acetate, cellophane or mica may be regarded as a preferred construction for obtaining circularly polarized light, the quarter wave plate having its axes disposed at 45° relative to the axes of the birefringent component.

Further considering Fig. 2 and the transmittal of light through layers 24 and 22 and element 18, said layers and element may be regarded as together forming a "refractor" and surface 20 as forming a "reflector." A desirable formation of said components provides a center of curvature of the reflector at the center of the refractor and a focal length of the refractor which provides an approximate focusing of parallel light incident the refractor to an image on the reflector. When the object is moved, this construction produces a movement of said image relative to surface areas of the reflector and contributes to an interplay of interference colors by causing the image forming rays to pass through varying thicknesses of the components. Where similar components to those above-described relative to Fig. 2 are included in other constructions herein they may be considered as having similar properties thereto unless otherwise specified.

Figure 3:
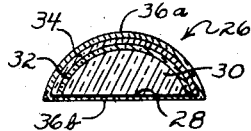

Fig. 3 illustrates an object 26 which includes components similar to those of Fig. 2, namely, a reflecting surface 28, a transparent supporting element 30, a birefringent layer 32 and a polarizing layer 34. While reflecting surface 28 is shown as flat, the curved construction of surface 20 of Fig. 2 is preferred, as above mentioned. An additional protective layer comprising portions 36a and 36b is formed upon the assembly. Said layer may be formed, for example, of a glass sheath in which the assembly is encased. A coating of a bonding substance, such as one of those above-described, may be applied to the assembly and said assembly then inserted in sheath portion 36a after which the sheath and assembly are pressed together. Protective layer 36a, 36b may also be formed of a suitable coating substance such as a resinous material or quartz. An appropriate resinous coating is Polymerin, manufactured by Ault and Wiborg Corporation. This coating may be thinned with Polymerin thinner and sprayed upon the assembly and then heated for providing a lasting surface. Quartz or another suitable protective coating material may be deposited upon the assembly by thermal evaporation in a vacuum.

Figure 4:
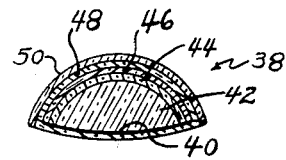

Fig. 4 illustrates an object 38 such as a synthetic jewel comprising a reflecting surface 40, a supporting transparent element 42, a birefringent layer 44, a polarizing layer 46, a protective layer 48 and a reflection-reducing coating 50 applied to layer 48. Reflection-reducing coatings will be seen to have a special significance when employed with products of the invention where light is reflected from an inner surface or surfaces and where the maximum transmittal of light thereto is of importance. Inasmuch as certain vibration components are absorbed by the polarizing layer, the desirability of avoiding light losses by reflection from an outer surface will further be apparent.

It is generally known that a film having a thickness of one-quarter of the wave length of light (or an odd number of fourths thereof) and a refractive index which is the square root of the index of the material upon which it is deposited may be formed on a surface for reducing reflection from said surface. It is also known that a plurality of said films of alternate thickness and refractive index may be used for a similar purpose. One such reflection-reducing means consists of a layer of negligible optical thickness and high transmission of copper, silver, rhodium or aluminum formed on a surface by thermal evaporation or sputtering in vacuum. Over this layer, by a similar method, may be formed a second layer of quartz, beryl, albite, corundum or other suitable material of a scratch resistant type. The second layer may appropriately have an optical thickness of from one-eighth to three-quarters of a wave length of light. Another method involves the forming of a film of a compound comprising thorium and fluorine on the surface by thermal evaporation in vacuum and the deposition of a second film of zinc sulphide of negligible optical thickness on the first film. Still other reflection-reducing coatings may be formed by depositing successive coatings of barium stearate and stearic acid, or a single coating of a metallic fluoride. A dipping or spraying method contemplates successive coatings of a solution of ethyl alcohol and titanium tetrachloride and a solution of ethyl alcohol, tetraethylorthosilicate, ethyl acetate and hydrochloric acid. Where such reflection-reducing coatings also have the property of resisting abrasion and other attack, it will be evident that they may serve a two-fold purpose as external layers.

Thin semi-reflecting metallic films and so-called reflection-increasing and color-selective films may be employed in place of opaque reflecting surfaces and elsewhere in constructions of the invention, said films being capable of transmitting as well as reflecting incident light. It will be apparent that where a reflecting surface such as surface 20 of Fig. 2 is shown, if said surface were semi-reflecting and backed by a second polarizing layer having, for example, its polarizing direction crossed with respect to that of polarizing layer 24 the object would be capable of reflecting a given interference color and transmitting a complementary interference color. A modification of the constructions shown herein also contemplates the elimination of surface 20 and the addition of said second polarizing layer whereby the interference colors are produced by transmitted light only and are affected by the lens-like constructions involved and the aforesaid varying retardations thereby accruing.

Further referring to reflection-increasing and color-selective films, a single coating of a solution of ethyl alcohol and titanium tetrachloride may be employed as a reflection-increasing film. Successive layers of zinc sulphide of relatively high index and cryolite or thorium oxifluoride of relatively low index could be formed on a surface for selectively transmitting one color, i. e. blue, and for reflecting another color, i. e. yellow. By repeating the process of forming alternate layers of predeterminedly low and high index the amount of reflection for light of a particular wave length may be increased, the controlling factor being optical thickness, as determined by thickness divided by index of refraction. It is known that such color-selective films or layers are sensitive to the angle which the incident beam makes therewith and such coatings could also be applied to an interface such as 142 of Fig. 12 for cooperating with other components of the construction in producing modifications of interference color effects. A further method contemplates the forming of the reflecting means (20 of Fig. 2, 28 of Fig. 3 et cetera), reading downwardly in the drawings, of a first semi-transparent mirror layer and a second relatively opaque backing mirror layer of good reflectivity for reflecting light of a given interference order through the coaction of beams reflected from each layer. The semi-transparent layer may suitably be formed of calcium fluoride, lead sulphide, stibnite, molybdenite or the like. The backing mirror layer may appropriately be formed of aluminum, magnesium, silver or another metal. The interference color thus produced may serve to cooperate with the interference color provided by polarizing and birefringent components of the construction. Generally referring to metallic reflecting surfaces which may be employed, it is known that different metals have various inherent characteristics relative to selective absorption of light of given wave lengths. It is further known that such surfaces have certain properties relating to elliptical and circular polarization of light. These two considerations may be employed for providing further modifications of the invention. The principal or basic constructions and methods for obtaining interference colors in products of the invention are, however, to be construed as those relating to the coaction of light-polarizing and birefringent (or optically active) components with a substantially non-color-selective reflecting means and, accordingly, the obtaining of said colors through the contributive function of reflection-modifying coatings or films is to be regarded merely as supplemental to said basic constructions and methods. A fluorescent or phosphorescent material of any suitable known type could also be incorporated with or provided in a coating adjacent an outer layer of an object of the invention to provide a color, by emission of light therefrom, which is correlated with a color produced by other means described herein.

Figure 5:
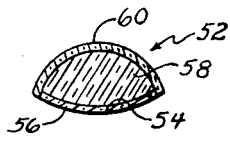

Fig. 5 illustrates an assembly 52 comprising a reflecting surface 54, either a birefringent or optically active layer 56, a transparent supporting element 58 and a polarizing layer 60. Assuming layer 56 to be birefringent, Fig. 5 represents an assembly which is less preferred than those wherein the birefringent layer is superposed on the convex surface of the supporting element, inasmuch as a more noticeable depth, crystal-like quality and interplay of interference colors will be observed in the latter form. However, a generally desirable operation and effect may be achieved through the arrangement of Fig. 5. Layer 56 may, alternatively, be substantially flat providing a plane reflecting surface. The construction of Fig. 5 and the use of a flat lower surface therewith may offer special advantages where the birefringent material is of a type preferably positioned so as to intercept light rays traversing lower portions of the assembly and where said material is not readily formed on a curved surface.

Figure 6:

Another alternate assembly 62 is shown in Fig. 6 and comprises a lens-like birefringent supporting element 64, having a reflecting surface 66, and a polarizing layer 68. This construction is somewhat less preferred because of limitations relating to the birefringent element. Said element might require the shaping of a rod or block which has been stretched to acquire a given birefringence. Accordingly, the birefringence would be modified by altering its thickness during the shaping process. This would entail a somewhat costly and cumbersome method as compared to the use of a birefringent layer or layers which can readily be stretched to the proper degree when observed in polarized light. However, distinctive optical effects which might be obtained through a birefringent element 64 justify its inclusion as an alternate form. Element 64 could be formed of any of the aforementioned plastic materials adapted to be rendered birefringent or could be constructed of an unannealed glass or plastic material or an enclosed fluid such as glycerin which has been compressed or the like to show a strain pattern. A further modification contemplates the combination of a birefringent element 64 with a birefringent layer or layers of the type described relative to Fig. 2 whereby different birefringent characteristics are achieved. Element 64 could also comprise an enclosed optically active fluid such as sugar syrup, oil of lemon or oil of turpentine for producing rotatory polarization but the thickness required of such fluids for an appreciable rotation of planes of polarization renders the suggestion somewhat impracticable unless a suitable fluid of higher rotatory power is provided.

Figure 7:
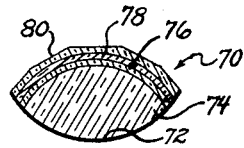

In Fig. 7 an assembly 70 comprises a reflecting surface 72, a transparent supporting element 74, a birefringent layer 76, a polarizing layer 78 and a faceted transparent layer 80. Layer 80 may be in the form of a glass or plastic sheath having its facets cut thereon or formed by a molding process. A reflection-reducing coating could be applied to layer 80 as hereinbefore described. A faceted surface is, in general, considered to be less satisfactory in appearance than the curved surfaces predominantly shown herein because the natural arrangement and interplay of interference colors and the apparent presence of strata in the objects are somewhat impaired by the facet edges.

Figure 8:
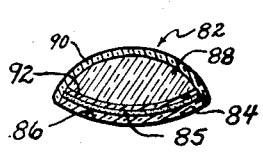

Fig. 8 illustrates an object 82 comprising a transparent plate 84 having a reflecting surface 86, a supporting element 88, a polarizing layer 90 and a "grown" birefringent crystal or plurality of crystals 85. Crystal component 85 may preferably be formed between plate 84 and a second plate 92, the plates being assembled with supporting element 88 after growth of the crystal. The crystal may be formed, for example, of benzoic acid, cinnamic acid, succinic acid, cinchonine, santonine or the like. Benzoic acid, slightly heated and allowed to recrystallize, provides a preferred crystal component. A modification contemplates the formation of the crystal on a suitably prepared surface of supporting element 88 and the covering of the crystal with a fluid plastic material which is then hardened. Other crystalline substances which may be employed through evaporation to form birefringent films are solutions of tartaric acid, citric acid, oxalic acid, chlorates and nitrates. Various other modifications of the methods of forming and positioning such crystalline components will be apparent.

Figure 9:
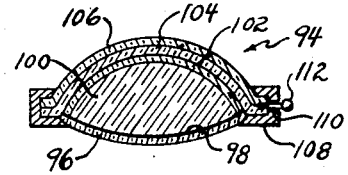

Fig. 9 represents a circular object 94 wherein one or more of the layers may be rotated for varying the interference colors and, if the birefringent layer includes a plurality of symmetrically arranged portions having differently extending optic axes, for varying a design or pattern also. Object 94 comprises a transparent layer 96, such as glass, having a reflecting surface 98, a supporting transparent element 100, a birefringent layer 102, a polarizing layer 104 and a protective layer 106, preferably of glass. The assembly is carried by a mounting ring 108 having a slot 110. At least layer 104 is to be mounted for rotation and, as shown, layer 106 is bonded thereto so that both layers are unitary and rotatable together. A small knob 112 is attached to the rotatable layers and protrudes from slot 110 so that it may be manually actuated. Rotation of layer 104 provides an alteration of the polarizing direction thereof relative to the principal axis of birefringent layer 102 and produces a variation of the interference color or colors. A birefringent layer or layers may also be mounted for rotation to provide further interference effects. A quarter wave plate positioned between layer 102 and reflecting surface 98 could be employed for producing circularly polarized light and, accordingly, for increasing the range of obtainable interference colors. Rotatable elements could be positioned between thin glass elements or slightly spaced from adjacent components to prevent scratching of the surfaces. If suitable sealing means are added, a microscope type of immersion oil could be placed between fixed and rotatable surfaces as a scratch prevention means. Dust and moisture sealing means could also be employed.

Figure 10:
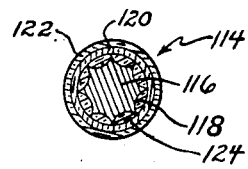

Fig. 10 is a cross-sectional view of a generally cylindrical object 114. A core 116 is provided with a plurality of concave reflecting surfaces 118. A birefringent layer 120 and a polarizing layer 122 are formed around the core, a transparent plastic filler 124 being formed into lens-like components between reflecting surfaces 118 and birefringent layer 120. Interference colors are visible from any position radially of the object.

Figure 11:
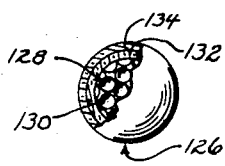
Fig. 11 is a perspective view, partly in cross-section and with parts broken away, of another form of the invention.

A generally spherical object 126 is shown in Fig. 11 comprising a core 128 having a plurality of concave reflecting surfaces 130, a birefringent layer 132 and a polarizing layer 134. A transparent plastic material, not shown, may preferably be interposed between surfaces 130 and birefringent layer 132. This construction provides a visible interference color or colors in all directions.

Figure 12:
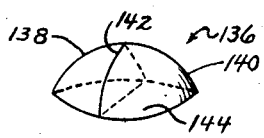
Fig. 12 is a perspective view of a further embodiment of the invention.

Fig. 12 illustrates an object 136 formed of transparent bonded segments 138 and 140. Each segment constitutes an assembly of a supporting element and polarizing and birefringent components. A reflecting or semi-reflecting interface 142 is provided between the segments for cooperating with a reflecting surface 144 to provide interference colors in a plurality of directions.

Figure 13:
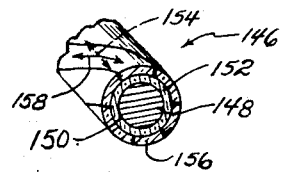
Fig. 13 is a perspective view, partly in cross-section, of another construction of the invention.

In Fig. 13, an assembly 146 comprises a curved core 148 having a reflecting or semi-reflecting surface 150. Said core may be formed of a metal or of a plastic having a metallic substance dispersed therein or coated thereupon. A birefringent layer 152, appropriately having a principal axis or direction of orientation 154, and a polarizing layer 156, having a polarizing direction 158 are superposed on the core. Said polarizing and birefringent directions may appropriately be disposed at 45° relative to one another. Layer 156 may, for example, be formed of one or more filamentous or strip-like flexible polarizing components twisted spirally around the birefringent layer to provide said angular relationship of directions. The birefringent layer may appropriately be assumed to have been stretched while superposed upon a stretchable core or to have been overlaid on the core after stretching of said layer. If preferred, the birefringent layer could be formed so as to have a spiral orientation and the polarizing layer could be longitudinally oriented. If the polarizing layer were to be oriented by stretching in such a construction, the spiral birefringent layer might preferably be originally twisted in overlapping relation on a stretchable core at an angle approximating 90° and altered by longitudinal stretch to the 45° angle. Alternatively, one or both of the layers could be in the form of coatings to which fields of force or other treatments, previously described for obtaining desired orientations, could be applied. One method contemplates coating a stretchable reflecting core 148 with a material such as polyvinyl alcohol, cellulose acetate, ethyl cellulose or the like, twisting said coating and core to provide a 45° twist, stretching the twisted components longitudinally, untwisting the components whereby a spiral orientation of the coating is formed, applying a subcoat thereto as may be required followed by a second coating of polyvinyl alcohol, stretching the assembly longitudinally so as to provide a longitudinal orientation of said second layer of polyvinyl alcohol without appreciably disrupting the spiral orientation of the birefringent layer, and finally subjecting the second layer of polyvinyl alcohol to a polarizing treatment such as a dichroic dye or stain. A protective coating may then be added. Alternatively, the polarizing layer could be formed of a crystalline type wherein the desired orientation could be obtained by a smearing or rubbing process or the like. Assembly 146 could be of either rigid or flexible form, according to the choice of above-described methods and materials. If flexible, the assembly would be adapted to use as an ornamental strand for forming a necklace, a fabric or some other product where brilliant interference colors were desirable. By altering the core or coating thereon to render the same semi-reflecting rather than fully reflecting and employing the spirally oriented polarizing component, above-described, the strand would be adapted to reflect a given interference color and to transmit another interference color inasmuch as crossed polarizing portions and suitably oriented birefringement portions would be employed for transmitting light diametrically through said strand.

Where the selective absorption properties of metallic reflecting surfaces for different wave lengths of light are employed for modifying the interference colors said properties are well known. For example, a gold reflecting surface tends to strengthen the green, red and yellow interference colors. An aluminum reflecting surface provides a satisfactory type for general purposes. The polarizing material employed may be of a type, known to the art, which predominantly transmits a light component of a given wave length and this property may be employed for influencing the interference color obtained. Various tinctures, dyes or the like may be incorporated with any of the elements of the object as, for example, with the supporting element or with the outer protective layer for further modifying the interference colors.

The use of a light-diffusing component provides a "softening" of the color effects and thus permits considerable variation in the appearance of an object of the invention. Materials such as a matte or opal acetate, a pearl essence or any other suitable diffusing substance or treatment may be employed. A reflecting surface which partially diffuses incident light, such as the reverse side of an aluminum foil or a coating formed from a suspension of an aluminum or other metallic powder may also be used to advantage.

Where a birefringent film material is utilized, the constructions are not limited to a single layer thereof. Several birefringent layers may be used for obtaining various effects. Small segments of birefringent material such as small fragments of cellophane, mica or other crystalline substances could be utilized for giving the appearance of strata similar to that of an opal. A potentially birefringent film may be differentially stretched as to degree and direction to acquire a differential thickness and orientation and, accordingly, it will contribute to a wide variance of interference color characteristics. A polarizing film may similarly be treated to vary its polarizing properties. Relative to a birefringent component, said component may consist of a uniaxial or biaxial crystalline substance and may be so positioned in the assembly as to have convergent polarized light incident the same for obtaining special effects known to the art. Various configurations such as so-called zone plates or other designs may be formed in a component of the assembly by etching, burnishing, treatment with a solvent or the like and, furthermore, the orientation of light-polarizing and birefringent materials employed may be altered thereby.

In production, it is contemplated that the forming of individual components to the shapes required for assembly may advantageously be performed preliminarily thereto. Accordingly, each component may be preformed in quantity through the use of suitable matrices, dies, solvents, dopes, carrying layers, heat and pressure and the like. The preformed components may then be assembled and laminated together. Finally they may be encased in a protective layer and treated with a reflection-modifying coating as above-described. Among contemplated production methods, the transparent supporting element would be molded or otherwise shaped and a rear reflecting surface be formed thereupon, as by a metallic deposition. The birefringent and light-polarizing components would be formed from film materials, individually, or together if said film materials were correctly relatively oriented and prelaminated, by embossing and stamping said materials to provide a plurality of desired forms of the invention. Said embossing might preferably be performed at a low rate of speed in an environment of heat and/or other controlled softening medium for permitting deformation of the film materials without fracturing them or appreciably altering their orientation. The light-polarizing and birefringent components would then be superposed with the supporting element. A protective coating or sheath would preferably thereafter be applied to the assembly. Alternatively, the light-polarizing and birefringent components would be preformed, as above described, the supporting element would be formed by depositing a transparent plastic material in fluid form in the embossed concavity. The plastic material would be hardened, as by a controlled baking, and the rear or exposed surface of the supporting element would be properly shaped, as by application of a die or a grinding process, and have a metallic reflecting coating applied thereto, as above described. It will be understood that the reflecting surface could also readily be faceted if desired by shaping said exposed surface of the supporting element for the purpose. If the preformed birefringent component were superposed upon the supporting element adjacent the reflecting surface, said reflecting surface would be formed upon the exposed surface of said component and the preformed light-polarizing component would be superposed directly upon the opposite surface of the supporting element. Various other production methods will readily be apparent in view of the foregoing description. Where a plurality of forms of the invention are embossed in film materials, it is to be understood that areas comprising said plurality of forms may be utilized as a product of the invention as, for example, by providing a suitable transparent concavity-filling material and a reflecting surface therewith for reflection of interference colors or by bonding an additional suitably oriented polarizing layer to the birefringent component for transmittal of interference colors.

Where reflection-reducing, increasing and color-selective coatings are specified herein, it is to be understood that they may be applied to any of the various constructions shown and are not limited to that of Fig. 4. It is also to be understood that other components may be interchanged in many of the constructions and are not necessarily restricted to the construction of a given drawing.

It will be apparent that other modifications of the products and methods above-described may be made in accordance with the general principles exemplified herein. Accordingly, such examples as have been presented are to be regarded as merely illustrative and the invention may be otherwise embodied and practiced within the scope of the following claims.

I claim:

1. An article of manufacture for modifying incident light to provide predeterminedly variegated interference colors comprising in optically aligned relation a supporting converging lens element having a front and a rear surface, at least said front surface having a curved formation, a birefringent layer having a predetermined direction of a principal axis formed upon said front surface, a light-polarizing layer having a polarizing direction angularly disposed relative to said principal axis formed upon said birefringent layer, and light-reflecting means formed upon said rear surface, said incident light passing, respectively, through said polarizing and birefringent layers and converging lens element to said reflecting surface and reflected light passing reversely therethrough, the given thickness of said birefringent layer and direction of said principal axis relative to said polarizing direction, the refractive properties of said lens element, and the structural relation of said light polarizing layer, birefringent layer, lens element and light reflecting means to one another providing said variegated interference colors.

2. An article of manufacture for modifying incident light to provide predeterminedly variegated interference colors comprising in optically aligned relation a supporting converging lens element having curved front and rear surfaces, a birefringent layer having a predetermined direction of a principal axis formed upon said front surface, a light-polarizing layer having a polarizing direction angularly disposed relative to said principal axis formed upon said birefringent layer, and light-reflecting means formed upon said rear surface, said incident light passing, respectively, through said polarizing and birefringent layers and converging lens element to said reflecting surface and reflected light passing reversely therethrough, the given thickness of said birefringent layer and direction of said principal axis relative to said polarizing direction, the refractive properties of said lens element, and the structural relation of said light polarizing layer, birefringent layer, lens element and light reflecting means to one another providing said variegated interference colors.

3. An article of manufacture for modifying incident light to provide predeterminedly variegated interference colors comprising in optically aligned relation a supporting converging lens element having a front and a rear surface, at least said front surface having a curved formation, a birefringent layer having a predetermined direction of a principal axis formed upon said rear surface, a light-polarizing layer having a polarizing direction angularly disposed relative to said principal axis formed upon said front surface, and light-reflecting means formed upon said birefringent means, said incident light passing, respectively, through said polarizing layer, converging lens element, and birefringent layer to said reflecting surface and reflected light passing reversely therethrough, the given thickness of said birefringent layer and direction of said principal axis relative to said polarizing direction, the refractive properties of said lens element, and the structural relation of said light polarizing layer, lens element, birefringent layer, and light reflecting means to one another providing said variegated interference colors.

4. An article of manufacture for modifying incident light to provide predeterminedly variegated interference colors comprising in optically aligned relation a birefringent supporting converging lens element having a predetermined direction of a principal axis and a front and a rear surface, at least said front surface having a curved formation, a light-polarizing layer having a polarizing direction polarizing direction angularly disposed relative to said principal axis formed upon said front surface, and light-reflecting means formed upon said rear surface, said incident light passing, respectively, through said polarizing layer and birefringent converging lens element to said reflecting surface and reflected light passing reversely therethrough, the varying thickness of said lens element and direction of said principal axis relative to said polarizing direction, the refractive properties of said lens element, and the structural relation of said light polarizing layer, lens element, and light reflecting means to one another providing said variegated interference colors.

References Cited in the file of this patent

UNITED STATES PATENTS

| Number | Name | Date |
|---|---|---|
| 1,882,829 | Hall | Oct. 18, 1932 |
| 2,017,705 | Sproxton | Oct. 15, 1935 |
| 2,099,694 | Land | Nov. 23, 1937 |
| 2,120,365 | Kriebel | June 14, 1938 |
| 2,158,129 | Land | Mar. 16, 1939 |
| 2,220,861 | Blodgett | Nov. 5, 1940 |
| 2,270,210 | Barbieri | Jan. 13, 1942 |
| 2,270,270 | Clare | Jan. 20, 1942 |
| 2,287,546 | Binda | June 23, 1942 |
| 2,332,958 | West | Oct. 26, 1943 |
| 2,362,573 | MacNeille | Nov. 14, 1944 |
| 2,397,231 | Barnes | Mar. 26, 1946 |
| 2,473,857 | Burchell | June 21, 1949 |
| 2,519,547 | Colbert et al. | Aug. 22, 1950 |